(12) United States Patent
Kidman

(10) Patent No.: US 7,342,173 B1
(45) Date of Patent: Mar. 11, 2008

(54) MULTI-DIRECTIONAL-PORT JUNCTION BOX

(75) Inventor: Brent L. Kidman, Spanish Fork, UT (US)

(73) Assignee: Cheetah USA Corp., Sandy, UT (US)

( * ) Notice: Subject to any disclaimer, the term of this patent is extended or adjusted under 35 U.S.C. 154(b) by 0 days.

(21) Appl. No.: 11/329,986

(22) Filed: Jan. 11, 2006

Related U.S. Application Data

(60) Provisional application No. 60/643,017, filed on Jan. 11, 2005.

(51) Int. Cl.
*H01H 9/02* (2006.01)

(52) U.S. Cl. .............. 174/58; 174/53; 174/57; 174/481; 220/3.2; 220/3.3

(58) Field of Classification Search .......... 174/48, 174/49, 50, 53, 58, 57, 65 R, 480, 481, 650; 220/3.2, 3.3, 3.4, 3.5, 3.6, 3.7, 3.8, 4.02; 248/906; D13/152; 439/535, 536, 537, 439/538
See application file for complete search history.

(56) References Cited

U.S. PATENT DOCUMENTS

| | | | |
|---|---|---|---|
| 2,980,756 A | | 4/1961 | Kelleher |
| 3,848,764 A | | 11/1974 | Salg |
| 3,926,330 A | * | 12/1975 | Deming et al. ............ 174/58 |
| 4,007,852 A | * | 2/1977 | Gernhardt ............... 220/3.2 |
| 4,057,164 A | | 11/1977 | Maier |
| 4,105,862 A | | 8/1978 | Hoen |
| 4,281,773 A | | 8/1981 | Mengeu |
| 4,304,958 A | * | 12/1981 | Neff et al. ............. 174/65 R |
| 4,306,109 A | * | 12/1981 | Nattel .................. 174/65 R |
| 4,315,100 A | | 2/1982 | Haslbeck et al. |
| 4,316,999 A | * | 2/1982 | Nattel .................. 174/65 R |
| 4,348,547 A | * | 9/1982 | Bowden, Jr. ............ 220/3.2 |
| 4,389,535 A | * | 6/1983 | Slater et al. ............ 220/3.2 |
| 4,436,952 A | * | 3/1984 | Lockwood ............. 174/65 R |
| 4,605,816 A | * | 8/1986 | Jorgensen et al. ........ 220/3.2 |
| 4,724,282 A | * | 2/1988 | Troder ................. 174/65 R |
| 4,843,189 A | | 6/1989 | Jorgensen et al. |
| 4,948,317 A | | 8/1990 | Marinaro |
| 5,407,088 A | | 4/1995 | Jorgensen et al. |
| 6,107,568 A | | 8/2000 | Schnell et al. |
| 6,365,831 B1 | * | 4/2002 | Rupp et al. ............... 174/58 |

* cited by examiner

*Primary Examiner*—Angel R. Estrada
(74) *Attorney, Agent, or Firm*—Pate Pierce & Baird

(57) ABSTRACT

An electrical junction box is disclosed in one aspect of the present invention as including a housing; two or more wiring ports formed in the housing to accommodate electrical wiring routed into the housing; and tabs resiliently connected to the housing and substantially covering the wiring ports. The orientation of the tabs is varied to accommodate wiring entering the wiring ports from different directions. Due to their resilient characteristics, the tabs deflect upon routing wire through the wiring ports and allow the tabs to clamp down on the wires.

17 Claims, 9 Drawing Sheets

MULTI-DIRECTIONAL-PORT JUNCTION BOX

RELATED APPLICATIONS

This application claims priority to U.S. Provisional Patent Application Ser. No. 60/643,017, filed Jan. 11, 2005, and entitled CONNECTION BOX WITH ALTERNATING WIRE PORTS.

BACKGROUND

1. The Field of the Invention

This invention relates to electrical devices and, more particularly, to novel systems and methods for orienting wiring ports within a junction box.

2. The Background Art

Manually installing screws or other fasteners is often time-consuming. Additionally, in certain installations, an installer must employ his or her hands to hold several components as well as rotate a tool transferring rotation to a screw or other type of fastener. Maintaining all of the components in proper alignment is often difficult and requires skill. In any case, the complexity slows the installation process, requiring a series of steps. Completing a portion of a task is difficult when one lacks "enough hands to hold everything."

Power tools may simplify the installation process by providing the motion (e.g. rotation) necessary to advance or install a fastener. The power tool must, however, be held and positioned in a manner similar to a manual tool. Thus, the use of power tools may not significantly reduce demands on the installer.

An electrical junction box assembly is one example of a time-consuming fastener installation. Once an electrical fixture has been wired, the fixture is typically secured inside a junction box. Securement of the electrical fixture to the junction box often involves the installation of multiple screws. These screws are generally over an inch long and are relatively finely threaded. The length of the screws may be selected to accommodate a wider variety of junction box placements and wall paneling thicknesses. To complete a conventional electrical junction box assembly, a face plate is secured to the fixture by another screw.

In addition to the time involved installing screws, the installer must also struggle with the problem of routing wires into the junction box. That is, the placement and configuration of wiring ports in some junction boxes may not allow an installer to direct wire into a junction box neatly, efficiently, or according to the installer's preferences. Similar problems may be encountered in the installation of connections boxes used for a wide variety of devices and systems, including without limitation telephone, stereo, computer network, information systems, cable television system, and security systems fixtures.

The installation of the junction box screws requires an installer to concurrently hold a fixture, maintain screw alignment, and provide rotation to the screw. Often it is difficult to initiate engagement between the screw and the receiving aperture. Such difficulty typically arises because the receiving aperture may be obscured by the wall paneling or recessed into the wall. Once the screw is in engagement with the receiving aperture, the time-consuming and often laborious task of advancing the finely threaded screw remains.

Face plate screws and other securement devices may be unsightly as well as time-consuming and laborious to install. Screws used to secure face plates to junction boxes and fixtures are typically painted and are, therefore, exposed to chipping, tarnishing, wear, and oxidation. In certain applications, it may be desirable to use a snap-on face plate to provide fast securement without the use of screws to provide securement.

Attempts have been made to provide quick assembling junction boxes and fixture assemblies. Quick assembling devices typically involve at least some rotation of the fixture screws and, therefore, require the use of tools for installation. Often these devices are limited in how well they are able to engage the threads of the fixture screws. Thus, such devices may not provide a reliable and solid securement between the fixture and junction box.

What is needed is an anchor that provides a strong and reliable securement between a fixture and associated junction box. Such an anchor would also provide for quick and simple installation. Further needed is a screwless face plate that requires no additional components to accomplish a reliable securement.

Yet further needed is a junction box that allows an electrician to pull wire into the box from multiple directions, depending on the preference of the electrician. Such apparatus, systems, and methods would greatly reduce the time, skill level, and effort required to assemble and complete junction box installation (e.g. electrical fixture installation or the like).

BRIEF SUMMARY OF THE INVENTION

Consistent with the foregoing, and in accordance with the invention as embodied and broadly described herein, an electrical junction box is disclosed in one aspect of the invention as including a housing; two or more wiring ports in the housing to accommodate electrical wiring routed into the housing; and tabs resiliently connected to the housing and substantially covering the wiring ports. The orientation of the tabs is varied to accommodate wiring entering the wiring ports from different directions.

In certain embodiments, the wiring ports are similarly oriented on the housing and may be located substantially adjacent to one another. In this way, the access location in such a configuration is substantially the same for each port, but directionally different. The tabs covering each of the ports may be oriented such that wire may enter some ports from one direction, while wire may enter other ports from another direction. For example, in certain embodiments, some tabs may be oriented to accommodate wiring entering the junction box from a direction substantially normal perpendicular) to the top surface of the junction box. Other tabs may be oriented to accommodate wiring entering the junction box from a direction substantially normal (perpendicular) to a rear surface of the junction box. Upon passing through the ports, the tabs may deflect to accommodate the wires. Furthermore, the resilient nature of the tabs allows the tabs to clamp down on the wires.

BRIEF DESCRIPTION OF THE DRAWINGS

The foregoing and other objects and features of the invention will become more fully apparent from the following description, taken in conjunction with the accompanying drawings. Understanding that these drawings depict only typical embodiments of the invention and are, therefore, not to be considered limiting of its scope, the invention will be described with additional specificity and detail through use of the accompanying drawings in which.

DETAILED DESCRIPTION OF THE INVENTION

It will be readily understood that the junction box assemblies of the invention, as generally described and illustrated in the Figures herein, could be arranged and designed in a wide variety of different configurations. Thus, this description is not intended to limit the scope of the invention, but is merely representative of certain embodiments of devices and systems in accordance with the invention. Those of ordinary skill in the art will, of course, appreciate that various modifications to the details herein may be made without departing from the essential characteristics of the invention. Thus, the following information is intended only by way of example, and simply illustrates certain embodiments consistent with the invention.

Figure 1:
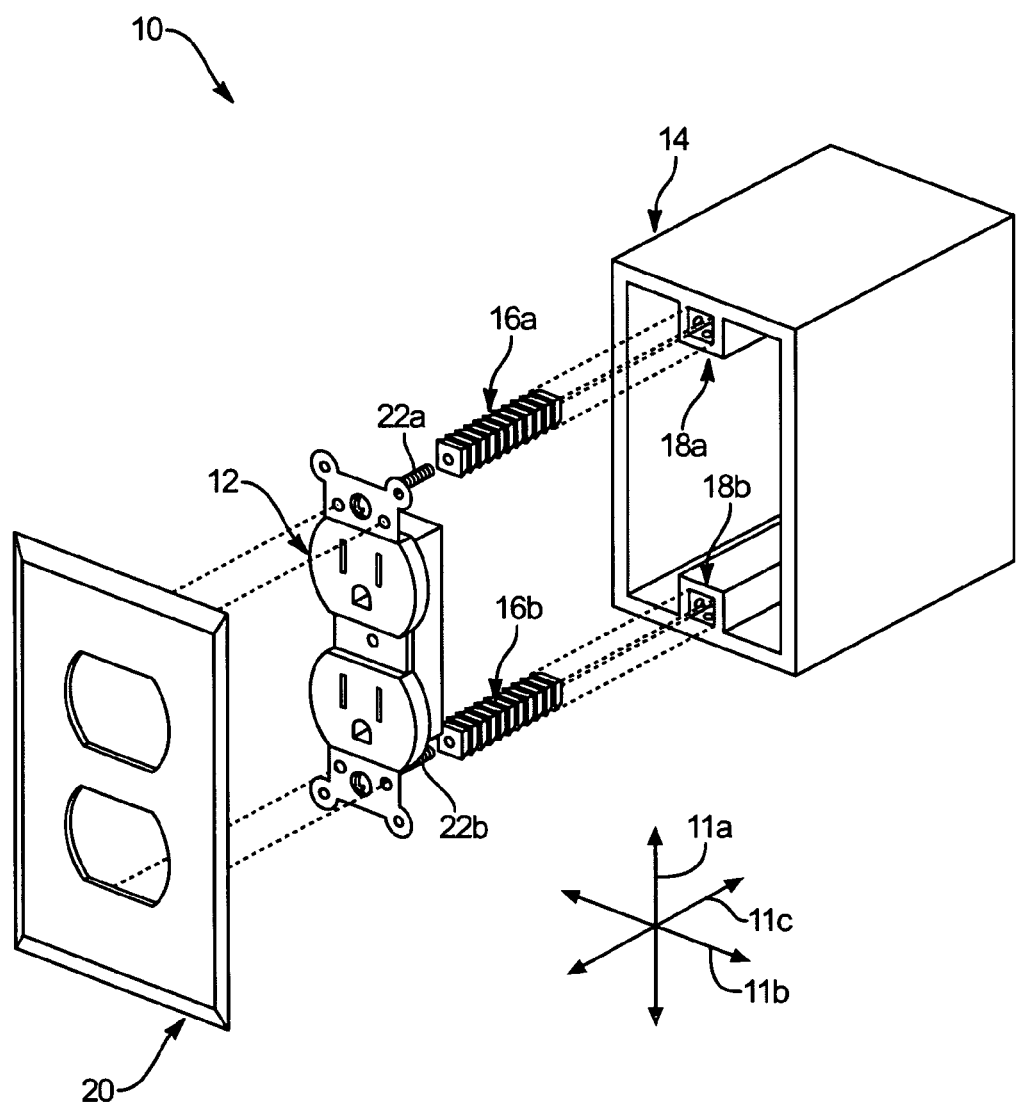
FIG. 1 is an exploded perspective view of a junction box assembly in accordance with the invention.

Referring to FIG. 1, in discussing the Figures, it may be advantageous to establish a reliable coordinate system to aid in the description of several of the embodiments in accordance with the invention. Coordinate axes 11 may be defined by longitudinal 11a, lateral 11b, and transverse directions 11c substantially orthogonal to one another.

A junction box assembly 10 in accordance with the invention may provide an apparatus for securing a fixture 12 to a junction box 14. In a factory manufacturing process, an anchor 16 may be secured to the fixture 12. The junction box 14 to which the fixture 12 is to be secured may have a receiver 18 associated therewith for admitting and retaining the anchor 16. Thus, the anchor 16 and receiver 18 may be intermediaries in the securement of the fixture 12 to the junction box 14. A face plate 20 may be provided to cover and hide the wiring and access apertures therebehind.

A fixture 12 may be any suitable piece for which securement is desired. For example, a fixture 12 may be a power receptacle, power switch, light fixture, telephone jack, network jack, cable connector, stereo system connector, information system connector, or any other unit 12 for which permanent or removable securement to a junction box 14 may be desired. In a similar manner, the junction box 14 may be any box to which a fixture 12 may be secured. A junction box 14 may be constructed of any suitable material. Suitable materials may include without limitation metals, polymers, composites, and the like. Additionally, a junction box 14, in accordance with the invention, may be of any suitable size. For example, a junction box 14 may be a single gang, double gang, triple gang, quadruple gang, quintuple gang, or the like. Some concepts presented herein are illustrated as a single gang box, however, the principles and concepts typically apply equally well to multiple-gang junction boxes.

Embodiments in accordance with the invention may be particularly well suited to assemblies that may be assembled in the field (i.e. not in a factory). Such field assemblies need not be limited to junction box assemblies 10. Embodiments in accordance with the invention may provide convenience and ease of assembly in the field where less than perfect conditions are often encountered.

An anchor 16 in accordance with the invention may be constructed, formed, machined, extruded, molded, cast, or otherwise made from any suitable material. Suitable materials may include without limitation metals, polymers, composites, or the like. For example, in certain embodiments, an anchor 16 may be formed of a polymer in a molding process. An anchor 16 may be secured to a fixture 12 in any suitable manner. In certain embodiments, an anchor 16 may be secured to a fixture 12 by a fastener 22 such as a bolt, rivet, screw, engagement prong, engagement hook, or the like. In other embodiments, an anchor 16 may be glued or otherwise bonded to a fixture 12. Additionally, an anchor 16 may be formed as an integral part of the fixture 12.

Each form of attachment between the anchor 16 and the fixture 12 may have particular advantages. In certain applications, such as the installation of power receptacles 12, switches 12, computer network outlets 12, cable television outlets 12, and the like an installer may need to remove a fixture 12 to gain access to something (e.g. wiring) tucked therebehind. In such a situation, screws 22 may provide an ideal attachment between the anchor 16 and the fixture 12. The screws 22 may be removed, thus freeing the fixture 12. The anchors 16 may maintain engagement with the junction box 14. After the revisions are complete, the fixture 12 may once again be secured to the anchors 16 by the insertion of the screws 22 previously removed.

In selected applications, multiple points of securement between a fixture 12 and a junction box 14 may exist. In such situations, an anchor 16 in accordance with the invention may be applied to all or a subset of the securement locations. For example, power receptacles 12 and switches 12 are typically secured to junction boxes 14 by two screws spaced from each other in a longitudinal direction 11a. An anchor 16a, 16b may be applied to fasteners 22a, 22b respectively. Similarly, a junction box 14 may have multiple receivers 18a, 18b to engage both anchors 16a, 16b, respectively.

The method of engagement between a receiver 18 and an anchor 16 may be selected to provide a fast, clean securement. By so doing, the fixture 12 may be secured to the junction box 14 in a minimum amount of time. For example, installers (e.g. electricians, network technicians, cable television installers, and the like) spend a large portion of their installation time screwing fixtures 12 to junction boxes 14. In certain embodiments in accordance with the invention, a fastener 22 (e.g. screw 22) may be introduced to secure an anchor 16 to the appropriate locations on a fixture 12 by a manufacturing machine. Thus, the installation of the fastener 22 may be performed in ideal conditions with proper alignment and fast tool speeds. In the field, when an installer installs the fixture 12, the time-consuming screw installation no longer needs to be performed. An anchor 16 may simply be inserted into a receiver 18.

The embodiments of the fixture 12, junction box 14, anchors 16a, 16b, receivers 18a, 18b, and face plate 20, as illustrated in FIG. 1 may be arranged and designed in a wide variety of different configurations that fall within the scope of the invention. Thus, the description hereinabove is not intended to limit the scope of the possible embodiments, but is merely representative of certain embodiments of devices and systems in accordance with the invention. The information is intended only by way of example.

Figure 2:
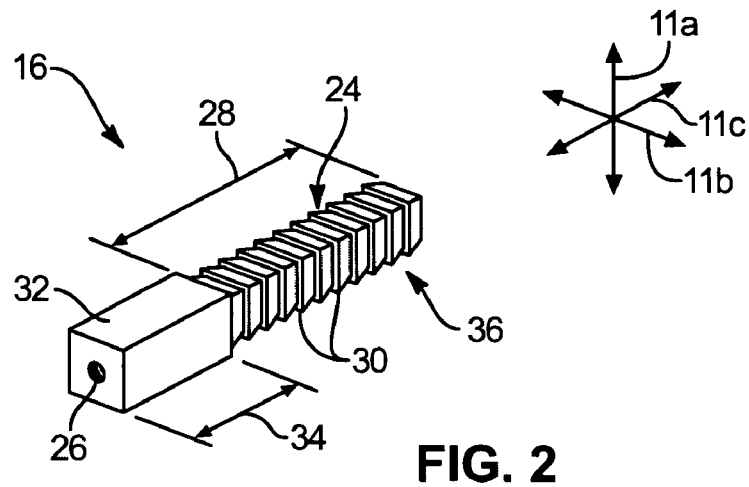
FIG. 2 is a perspective view of one embodiment of an anchor for use with the junction box assembly of FIG. 1.

Referring to FIG. 2, an anchor 16 in accordance with the invention may have an engagement mechanism 24 configured to provide a mechanical grip with a receiver 18. If an anchor 16 is to be secured to a fixture 12 by a bolt 22 or screw 22, an aperture 26 may be formed therein. The aperture 26 may extend completely or only partially through the anchor 16 in a transverse direction 11c.

A length 28 of the engagement mechanism 24 may be selected to provide a desired number of engagement locations 30. In selected embodiments, each engagement location 30 is a tooth 30. Additionally, the engagement length 28 and the number of engagement locations 30 may be selected to permit insertion of the anchor 16 a desired distance into the receiver 18. Thus, providing a desired alignment of the fixture 12 with respect to the junction box 14.

In selected embodiments, an anchor 16 in accordance with the invention may include a spacer 32. The length 34 of the spacer 32 may be selected to provide additional control over the spacing of the fixture 12 in relation to the junction box 14. Furthermore, in certain embodiments, one end 36 of the anchor 16 may be formed to promote easy insertion into the receiver 18. For example, an end 36 may be pointed, rounded, tapered, or the like.

An anchor 16 in accordance with the invention may have any suitable cross-section. For example, the cross-section may be rectangular, circular, triangular, oval, an unconventional shape, or the like. The cross-sectional shape of an anchor 16 may be selected to resist rotation about a transverse axis 11c once installed inside a receiver 18. For example, an anchor 16 having a generally circular cross-section may have a key-way formed therein to correspond to a key formed or located in the receiver 18.

The shape and configuration of a receiver 18 may be selected to match and complement the particular shape of a selected anchor 16. For example, if an anchor 16 having a rectangular cross section is desired, the receiver 18 may be formed to have a generally rectangular shape. Thus, the receiver 18 may admit the anchor 16 and hold the anchor 16 securely without motion (e.g rotation about a transverse axis 11c) therebetween.

Figure 3:
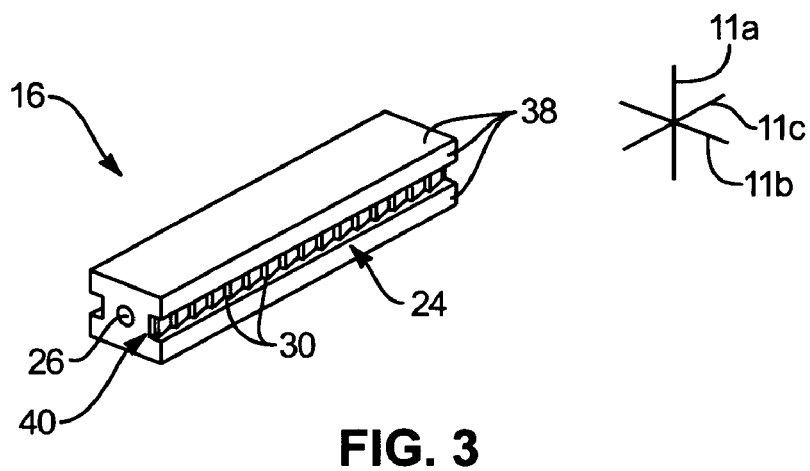
FIG. 3 is a perspective view of an alternative embodiment of an anchor for use with the junction box assembly of FIG. 1.

Referring to FIG. 3, in certain embodiments, an anchor 16 may have multiple sliding surfaces 38 to promote ease of insertion and proper alignment. A recessed groove 40 may be formed in one or more surfaces 38 of the anchor 16 to provide a location for disposition of an engagement mechanism 24. Such an engagement mechanism 24 may be recessed to reduce the risk of interfering with proper insertion of the anchor 16 into the receiver 18.

Figure 4:
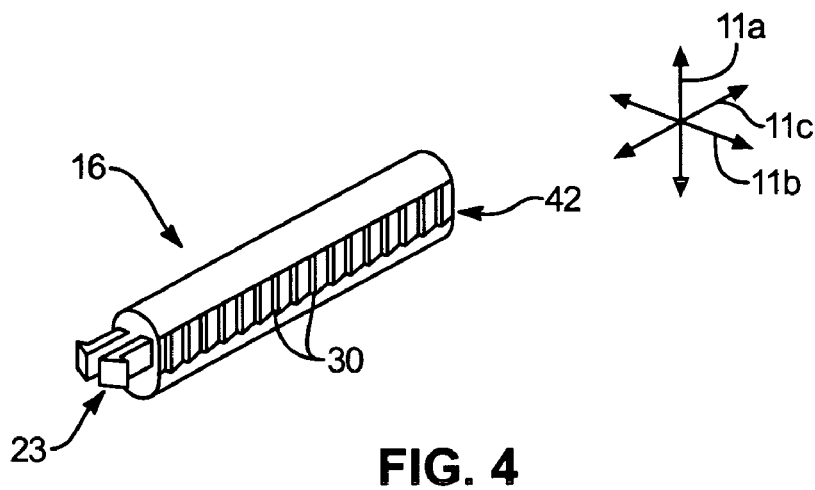
FIG. 4 is a perspective view of another alternative embodiment of an anchor for use with the junction box assembly of FIG. 1.

Referring to FIG. 4, in another embodiment, an anchor 16 may have a generally circular cross-section. In such an embodiment, the anchor may include a single flat 42 or may include a plurality of flats 42 that provide a location for disposition of an engagement mechanism 24. The flats 42 may also provide a location for a corresponding receiver 18 to engage the anchor 16 to resist rotation about a transverse axis 11c.

In certain embodiments, opposing engagement hooks 23 may be shaped to promote insertion into a corresponding aperture in a fixture 12. The engagement hooks 23 may be formed to engage an aperture of any suitable shape (e.g. circular, oval, triangular, or the like). The illustrated engagement hooks 23 have been formed in a shape to fit a square aperture. A square aperture may provide a mechanism to resist rotation of the anchor 16 about a transverse axis 11c with respect to a corresponding fixture 12. Engagement hooks 23 in accordance with the invention may flex to allow an anchor 16 to be separated from the fixture 12 to which the anchor 16 is attached. Once separated, the anchor 16 and fixture 12 may be reattached by reinserting the engagement hooks 23 of the anchor 16 through the corresponding aperture in the fixture 12.

The embodiments of anchors 16, as illustrated in FIGS. 2-4 may be arranged and designed in a wide variety of different configurations that fall within the scope of the invention. Thus, the description hereinabove is not intended to limit the scope of the possible embodiments, but is merely representative of certain embodiments of devices and systems in accordance with the invention.

Figure 5:
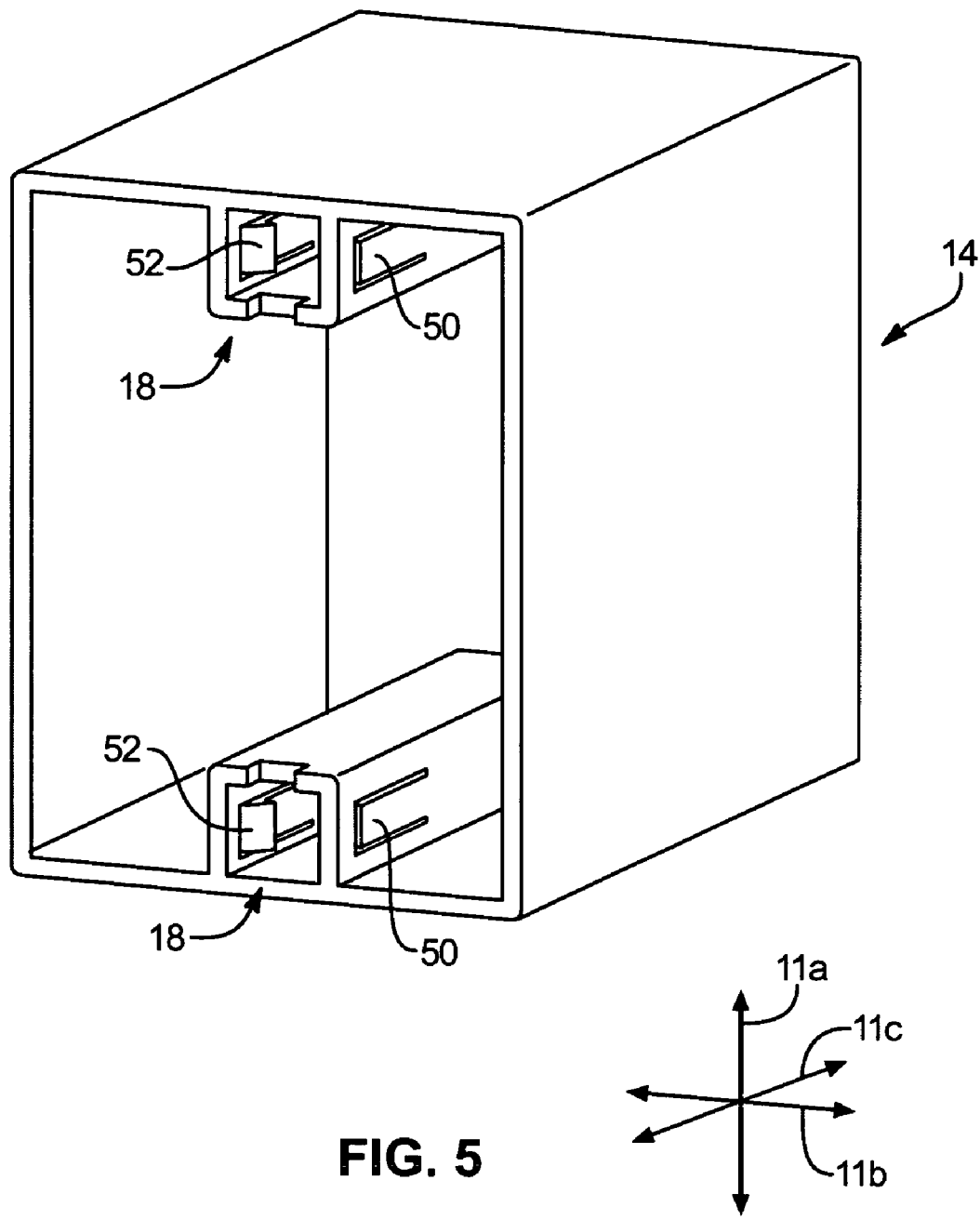
FIG. 5 is a perspective view of a junction box illustrating one embodiment of receivers and corresponding engagement mechanisms.

Referring to FIG. 5, in selected embodiments, a receiver 18 in accordance with the invention may include an engagement mechanism 50. This engagement mechanism 50 may be configured to engage the engagement mechanism 24 of an anchor 16. In selected embodiments, an engagement mechanism 50 may comprise hooks 52 or barbs 52 These barbs 52 may extend from the receiver 18 with a shape selected to engage the teeth 30 of the anchor 16. The engagement of the hooks 52 and teeth 30 may be selected to provide unidirectional motion so that an anchor 16 may be easily inserted yet resist removal in a transverse direction 11c. The number of teeth 30 and the distance therebetween may be selected to provide a virtual continuum of possible locking positions between the anchor 16 and the receiver 18. This assures a snug fit in a transverse direction 11c. Tooth pitch may be selected to be less than the deflection a "held" part can accommodate, and thus provide virtually no slack in the fit transversely.

A receiver 18 may be provided in a junction box 14 in any suitable manner. In selected embodiments, the receiver 18 may be formed as an integral part of the junction box 14. This forming may be part of a molding process. That is, the receiver 18 may be molded as part of the junction box 14 in its original forming process. In other embodiments, a receiver 18 may be formed (e.g. molded, extruded, cast, machined, stamped, or the like) and then joined to the junction box 14. Such a joining may be accomplished by bolting, screwing, welding, gluing, bonding, or the like.

Figure 6:
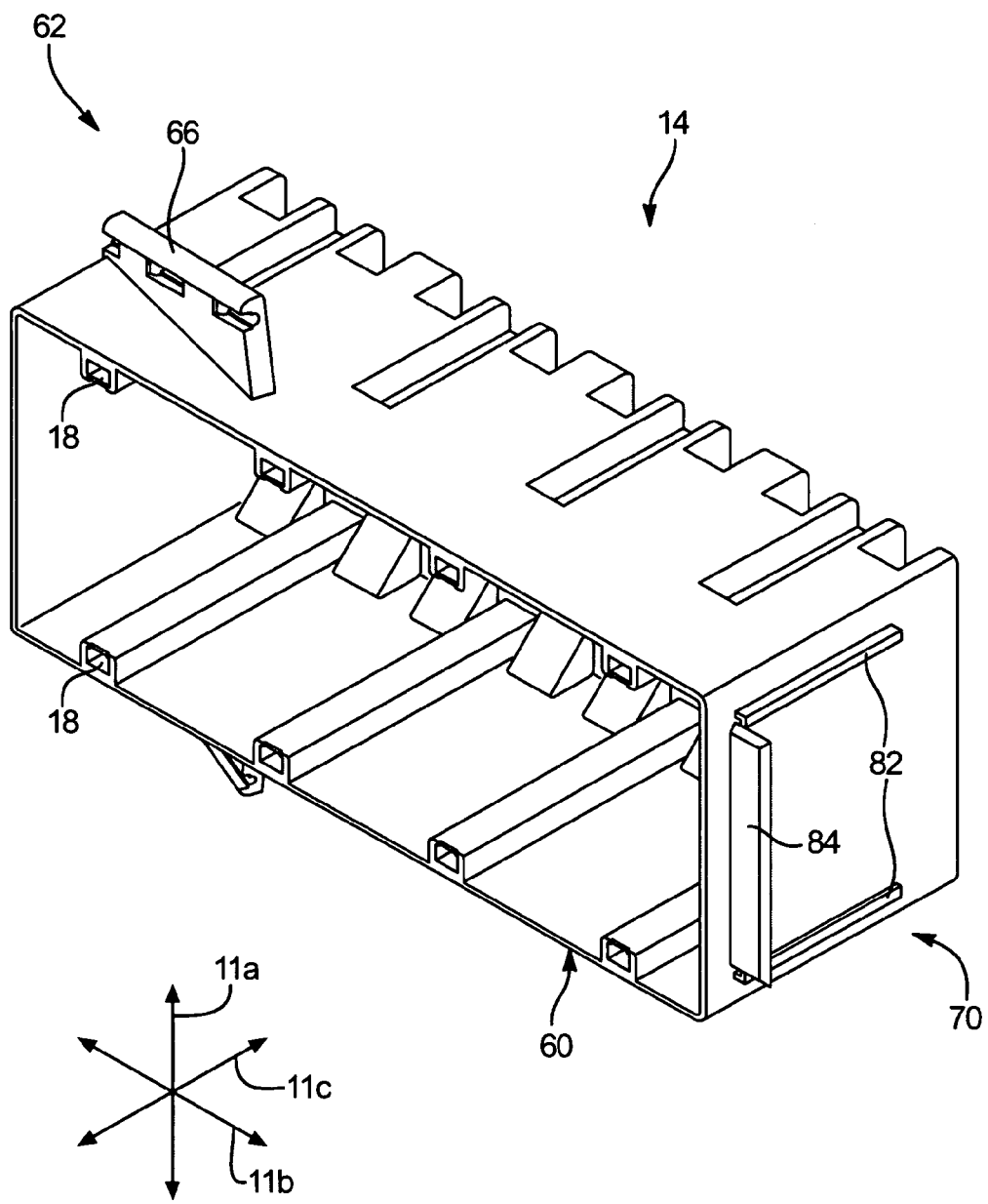
FIG. 6 is a perspective view of a multi-gang junction box having a slide to provide rearward support to the junction box.
Figure 7:
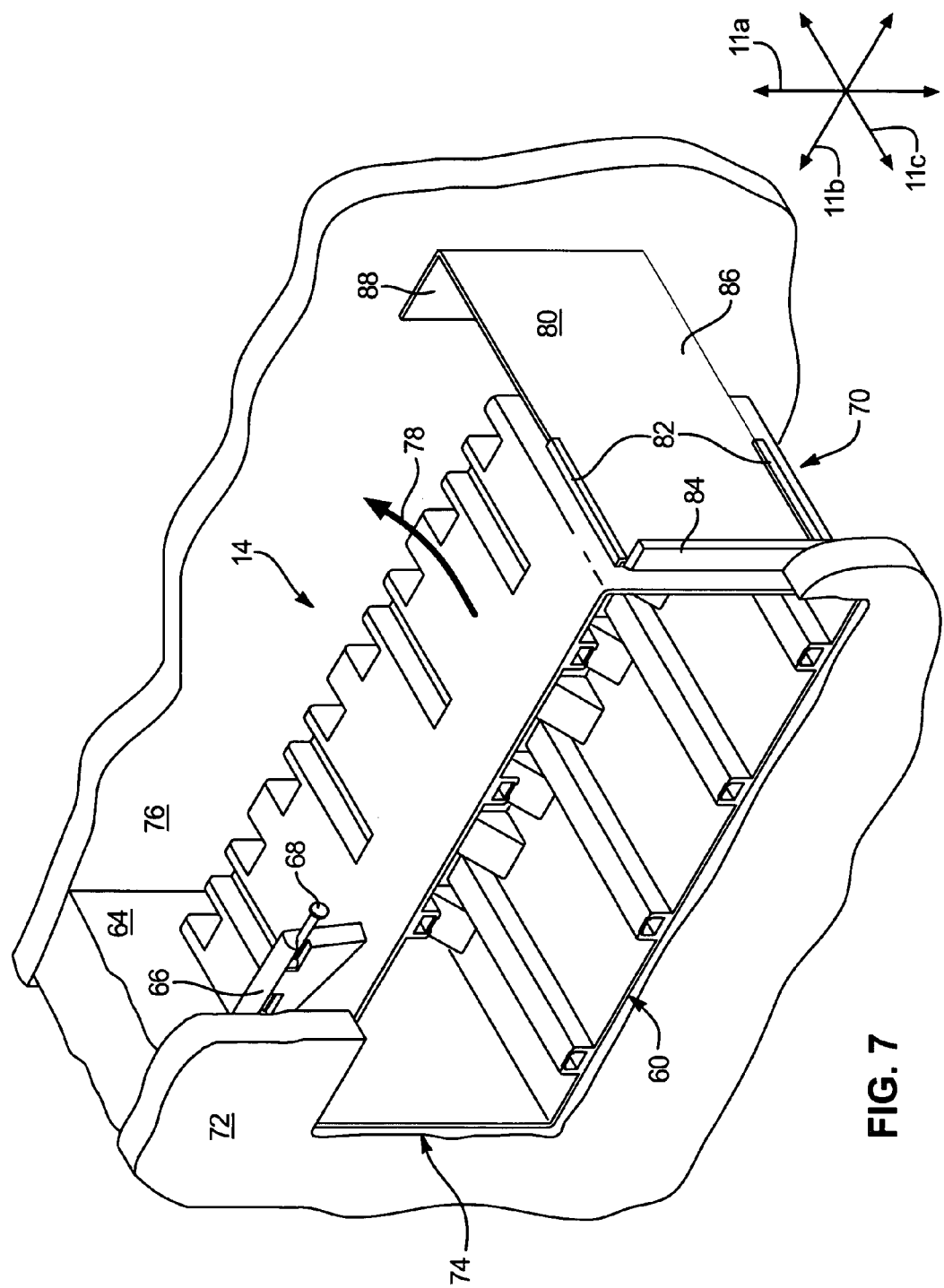
FIG. 7 is a partial perspective view of the junction box of FIG. 6 secured to a structural member located between front and back panels and supporting a spacer.
Figure 8:
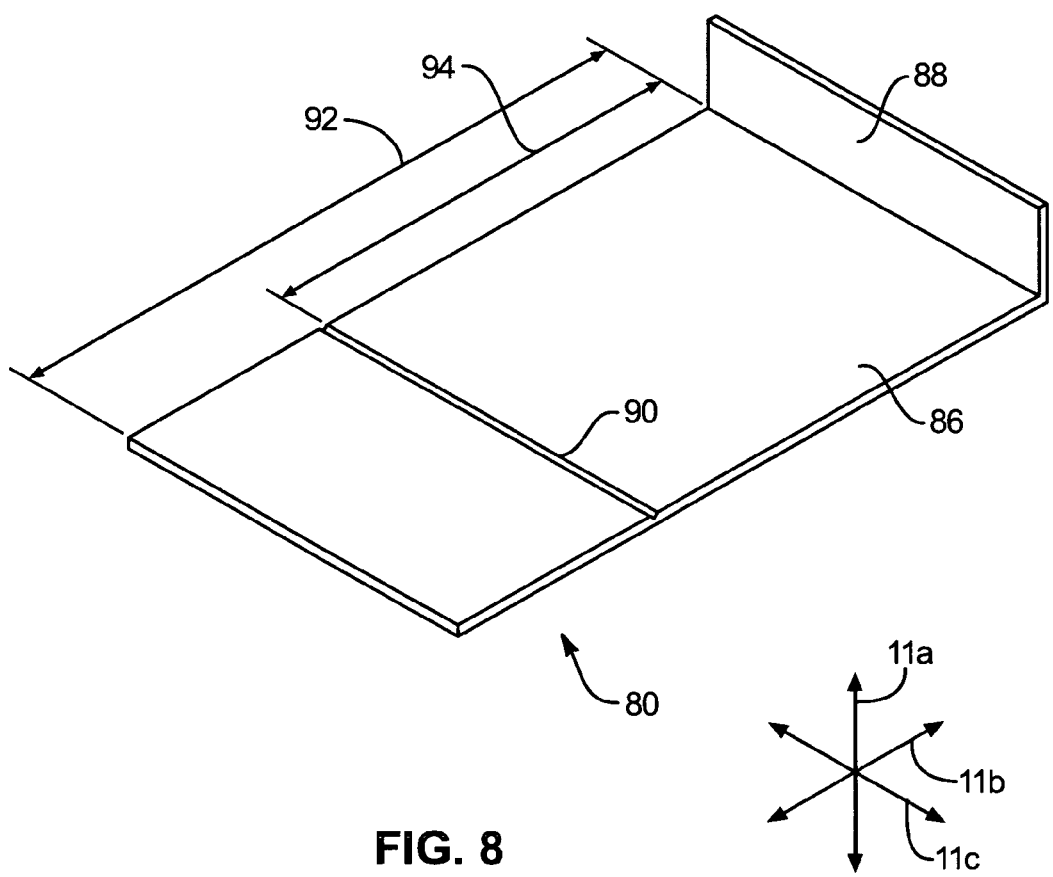
FIG. 8 is a perspective view of a spacer having a scored or weakened line and foot.

Referring to FIGS. 6 through 8, in certain applications, a junction box 14 may have an open face 60 A proximal end 62 of a junction box 14 may be formed to engage a structural member 64 (e.g. wall stud, floor joist). For example, the proximal end 62 may have an extension 66 to support a fastener 68. The fastener 68 (e.g. nail, screw) may in turn engage the structural member 64 and thus secure the junction box 14. The junction box 14 may have a distal end 70 spaced in the lateral direction 11b away from the proximal end 62 and the structural member 64.

In selected applications, a front panel 72 may secure to the structural member 64. In one embodiment, the face panel 72 may have an aperture 74 formed therein to expose the open face 60 of the junction box 14. A back panel 76 may secure to the structural member 64 opposite the face panel 72. The face and back panels 72, 76 may vary in form from application to application. For example, in selected applications the face and back panels 72, 76 may be drywall, wood paneling, concrete, some combination of drywall, wood, and concrete, or the like.

Typically, when a fixture 12 is installed, the face panel 72 is already in place and all that is visible of the junction box 14 is the open face 60. An attempt to insert an anchor 16 into a junction box 14 so arranged may cause the box 14 to deflect inwardly 78. The face panel 72 may prevent a user from gaining access to the junction box 14 and stopping the inward deflection 78. Inward deflection 78 is usually permitted by less than perfect engagement between the junction box 14 and the structural member 64. The inward deflection 78 is most noticeable on long, multi-gang junction boxes 14. In certain situations, the inward deflection 78 may preclude an installer from properly installing a fixture 12.

In certain embodiments, a junction box 14 in accordance with the invention may be formed with a standoff, foot, support, or spacer 80 to resist inward deflection 78. The spacer 80 may extend from the junction box 14 to contact the back panel 76, thus resisting inward deflection 78 in that direction. In selected embodiments, the junction box 14 and spacer 80 may be formed as separate pieces. For example, a junction box 14 may have a slide 82 secured to, or integrally formed with, the distal end 70 of the junction box 14. The slide 82 may receive the spacer 80 and maintain the spacer 80 directed toward the back panel 76. The slide 82 may permit an installer of the junction box 14 to install the spacer 80 onsite. Thus, the spacer 80 may only be applied to junction boxes 14 that may need it.

If desired, a face panel alignment stop 84 may act as a register for the spacer 80 with respect to the slide 82. That is, alignment stops 84 may be included on junction boxes 14 to register the open face 60 of the junction box 14 with respect to the face panel 72. It may be a simple matter to position the slide 82 so that the alignment stop 84 will register the spacer 80 and thus maintain the junction box 14 fixed in the transverse direction 11c away from the back panel 76. Additionally, the slide 82 may be formed to resist the removal of the spacer 80. In one embodiment, the slide 82 has sufficient frictional engagement with the spacer 80 to prevent inadvertent removal.

A spacer 80 in accordance with the invention may be formed of any suitable material. In selected embodiments, a spacer 80 may be formed of a polymer or a reinforced polymer. Additionally, a spacer 80 may have any suitable configuration. For example, in one embodiment, the spacer 80 may have an extension 86 and a distinct foot portion 88. The extension 86 may provide the spacing while the foot 88 may resist penetration of the spacer 80 into the back panel 76.

Spacers 80 in accordance with the invention may have extensions 86 of various lengths. In one embodiment, an extension 86 may have scores 90 or weakened lines 90 at various lengths associated with distances commonly found between the face and back panels 72, 76. For example, the distances between the face and back panels 72, 76 are often characteristic of the dimensions of the structural member 64. Thus, an extension 86 may have a first length 92 for fitting a two-by-six stud 64 and a score 90 at a second length 94 for fitting a two-by-four stud 64. The extension 86 may be used as is for a two-by-six wall and may be broken on the score 90 for use with a two-by-four wall.

Figure 9:
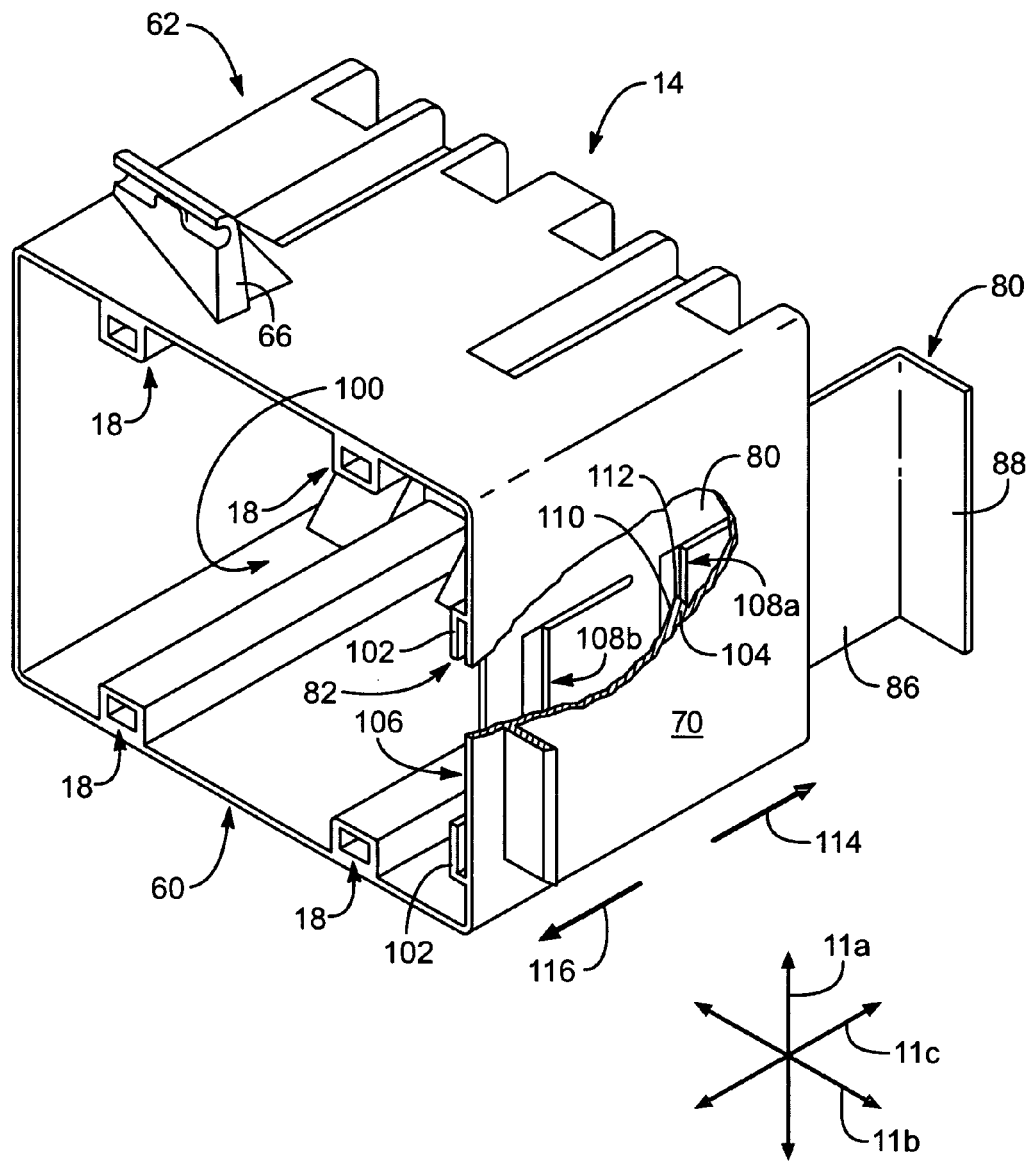
FIG. 9 is a cutaway perspective view of a junction box, slide, and spacer providing a unidirectional ratchet controlling the extension of the spacer from the junction box.

Referring to FIG. 9, in selected embodiments, it may be desirable to position a slide 82 within the interior cavity 100 of a junction box 14. Additionally, it may be desirable to have a spacer 80 that may be positioned with respect to the junction box 14, and consequently the back panel 76, without breaking the spacer 80 to adjust its length. When combined, a spacer 80 that may be positioned within a junction box 14 and adjusted without breaking may support adjustment, deployment, etc. of a spacer 80 even after paneling 72, 76 has been applied, severely limiting access to the exterior of the junction box 14.

For example, in one embodiment, a slide 82 may include a pair of guides 102 and one or more engagement mechanisms 104 (e.g. barbs) positioned on the interior surface 106 of the distal end 70 of the junction box 14. The guides 102 may limit the movement of a spacer 80 within a slide 82 in two dimensions (e.g. the longitudinal and lateral directions 11a, 11b) while permitting translation of the spacer 80 in a third dimension (e.g. the transverse direction 11c). A spacer 80 used in such an embodiment may include one or more engagement mechanisms 108. An engagement mechanism 104 of the slide 82 may engage an engagement mechanism 108 of the spacer 80 to control translation of the spacer 80 within the slide 82 along a third dimension.

In selected embodiments, one or more engagement mechanisms 104 of the slide 82 may interact with one or more engagement mechanisms 108 of the spacer 80 to provide a uni-directional ratchet. For example, in one embodiment, a barb 104 may selectively engage either of two engagement apertures 108a, 108b formed in the spacer 80. The barb 104 may include a ramp 110 and an engagement edge 112. By applying a force to the spacer 80, it may be advanced in a first direction 114 with respect to the barb 104 until the barb 104 enters a first engagement aperture 108a. Retraction of the spacer 80 in a second direction 116, opposite the first direction 114, then encounters resistance when the engagement edge 112 abuts the first engagement aperture 108a.

The ramp 110 need not engage the first engagement aperture 108a with the same strength as the engagement edge 112, thereby permitting continued advancement of the spacer 80 with respect to the barb 104 in the first direction 114. If desired, the spacer 80 may advance in the first direction 114 until the barb 104 engages a second engagement aperture 108b. Once the barb 104 enters the second engagement aperture 108b, translation of the spacer 80 in the second direction 116 with respect to the slide 82 may again be resisted.

The arrangement of the various engagement mechanisms 104, 108 may provide a uni-directional ratchet permitting comparatively easy advancement or extension yet firmly resisting retraction of the spacer 80 with respect to the junction box 14. Accordingly, once a junction box 14 is secured to a structural member 64, the spacer 80 may advance until it reaches the anticipated position of the back panel 76. When the back panel 76 is installed, retraction of the spacer 80 is resisted such that the spacing between the junction box 14 and the back panel 76 is maintained.

Alternatively, a spacer 80 may advance after both the front and back panels 72, 76 are installed. In such an arrangement, an installer may hold the junction box (e.g with pliers or the like) in a desired position while pushing the spacer 80 out the back of the junction box 14. The spacer 80 may advance until it contacts the back panel 76. Again, retraction of the spacer 80 may be resisted such that the spacing between the junction box 14 and the back panel 76 is maintained.

Engagement mechanisms 104, 108 may have any suitable arrangement to facilitate or support selective engagement and disengagement of the spacer 80 with respect to the slide 82. In certain embodiments, deflection may alleviate interference between interacting engagement mechanisms 104, 108, thereby easing the transition from one position of a spacer 80 with respect to a slide 82 to another.

In selected embodiments, the spacer 80, the slide 82, or both may deflect, such as by bowing outward to provide the clearance needed for the a barb 104 to pass from one engagement aperture 108a to another 108b. The thickness of the spacer 80 or slide 82 may be sized to provide a desired resistance to deflection. Additionally, the materials from which the spacer 80 and slide 82 are formed may be selected to provide a desired resistance to deflection. Generally, the thicker the component 80, 82 or the stiffer the material, the greater the resistance to deflection and the greater the force required to advance the spacer 80 with respect to the slide 82.

Figure 10:
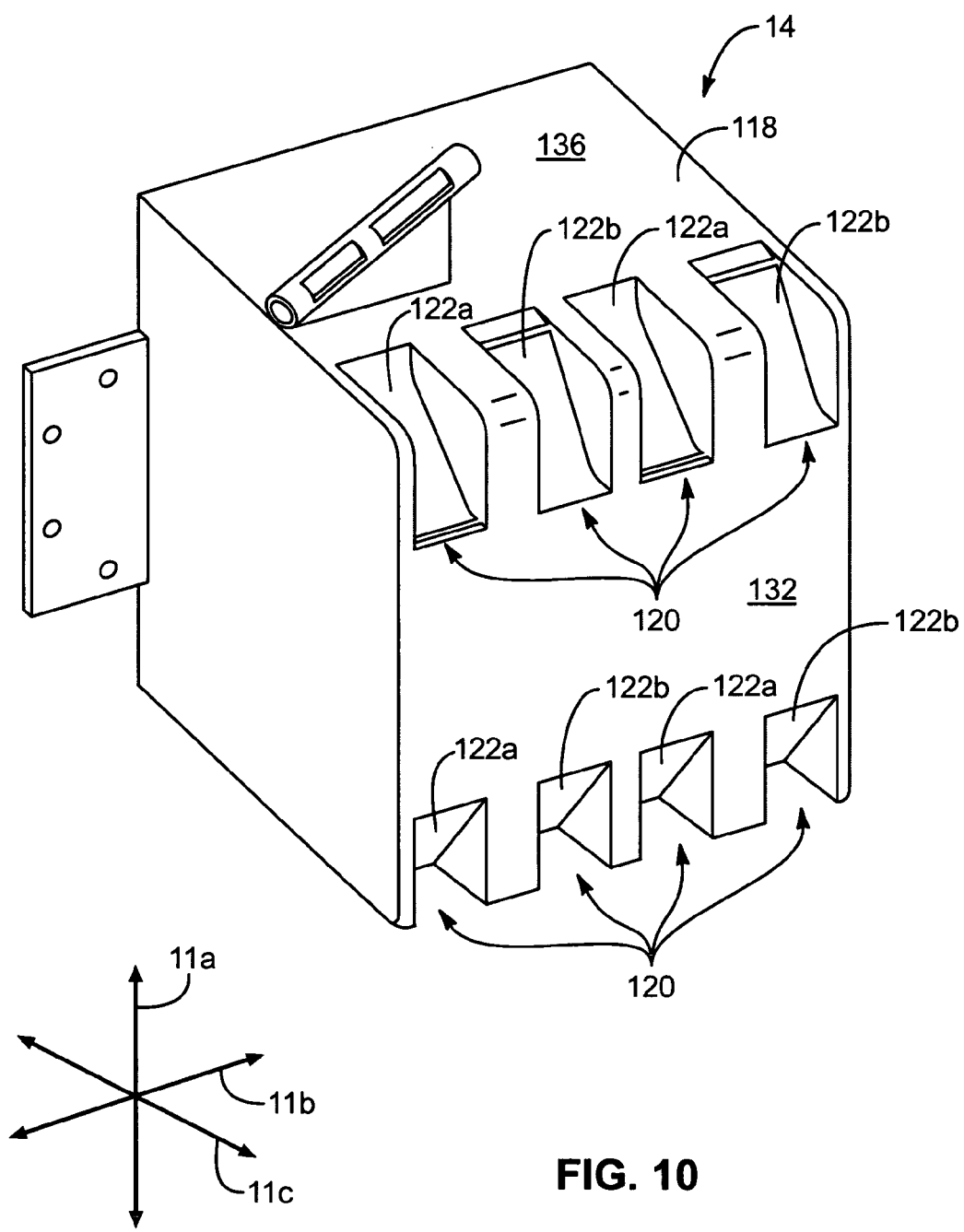
FIG. 10 is a perspective view of one embodiment of a junction box having wiring ports to accommodate wires entering the junction box from multiple directions.
Figure 11:
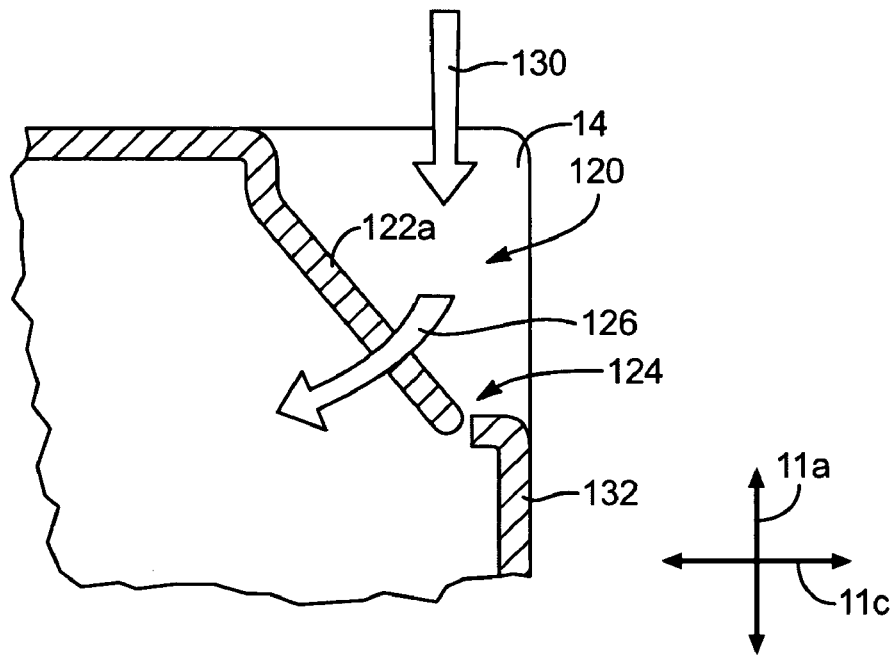
FIG. 11 is a partial, side, cross-sectional view of a wiring port opening in a first direction.
Figure 12:
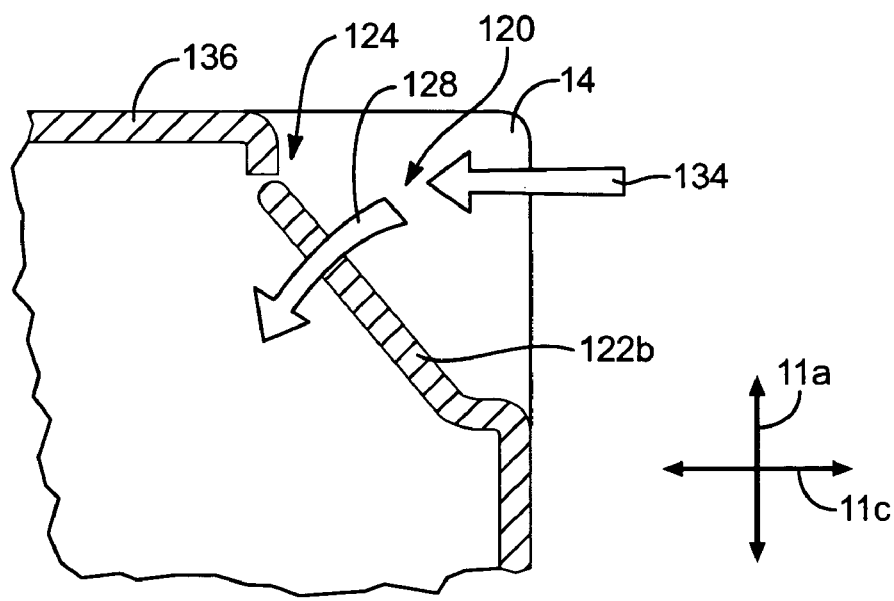
FIG. 12 is a partial, side, cross-sectional view of a wiring port opening in a second direction.

Referring to FIGS. 10 through 12, in selected embodiments in accordance with the invention, a junction box 14 may include a housing 118 incorporating one or more wiring ports 120. The wiring ports 120 provide locations where wire may be inserted into the junction box 14. In certain embodiments, each wiring port 120 may comprise a tab 122 extending to cover a corresponding aperture 124 in the junction box 14. If desired, the tabs 122 may be monolithically formed as part of the junction box 14. For example, the entire junction box 14 may be molded as a single unit from a polymeric material.

To admit a wire, the tabs 122 may be deflected (e.g. substantially resiliently deflected) such that at least a portion of the corresponding aperture 124 is exposed. In selected embodiments, certain tabs 122a may be configured to deflect along a path 126. Other tabs 122b may be configured to deflect along a path 128.

Tabs 122a that deflect along a path 126 may more easily admit wire in a first direction 130, substantially normal (perpendicular) to the top surface 136 of the junction box 14. These tabs 122a may allow an electrician to route wire into the junction box 14 substantially parallel to a rear surface 132 of the junction box. On the other hand, tabs 122b that deflect along a path 128 may more easily admit wire in a second direction 134, substantially normal (perpendicular) to a rear surface 132 of the junction box 14. These tabs 122b may allow an electrician to route wire into the junction box 14 substantially parallel to a top surface 136 of the junction box 14. The direction that wire is routed into the junction box 14 may depend on the location of fixture terminals inside the junction box 14, or alternatively, simply the preference of an installing electrician.

In other embodiments, the ports 120 and corresponding tabs 122 may be oriented to accommodate wires routed into the box 14 from directions other than those illustrated in FIGS. 11 and 12. Thus, the orientation of the tabs 122 is not limited to the orientations illustrated in FIGS. 11 and 12. Once wire is routed through the ports 120, the resilient tabs 122 may clamp down on the wires. This may resist or prevent wires from slipping back out of the ports 120. This clamping effect may also allow shorter wire leads to be inserted into each box 14. However, if wire is removed from a port 120, a corresponding tab 122 may return to its original position substantially covering the port 120.

In certain embodiments, tabs 122 having different orientations may be alternatingly distributed along the edge of a junction box 14. For example, in the double gang junction box illustrated in FIG. 10, a first set of tabs 122a may deflect in the first direction 126, while a second set of tabs 122b may deflect in the second direction 128. Although not mandatory, in certain embodiments, the orientation of tabs 122 located on adjacent wiring ports 120 may differ by approximately one hundred eighty degrees.

The invention may be embodied in other specific forms without departing from its essential characteristics. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. An electrical junction box comprising:
   a housing;
   a plurality of wiring ports in the housing to accommodate electrical wiring routed into the housing;
   a first tab resiliently connected to the housing and substantially covering a first wiring port of the plurality of wiring ports, the first tab being characterized by a first orientation to accommodate wiring entering the first wiring port from a first direction; and
   a second tab resiliently connected to the housing and substantially covering a second wiring port of the plurality of wiring ports, the second tab being characterized by a second orientation, differing from the first orientation by about one hundred eighty degrees, to accommodate wiring entering the second wiring port from a second direction.

2. The electrical junction box of claim 1, wherein the first and second wiring ports are similarly oriented on the housing.

3. The electrical junction box of claim 2, wherein the first wiring port is substantially adjacent to the second wiring port.

4. The electrical junction box of claim 3, wherein:
   the housing is characterized by a top surface, and the first direction is substantially normal to the top surface; and
   the housing is characterized by a rear surface, and the second direction is substantially normal to the rear surface.

5. The electrical junction box of claim 4, wherein the first and second tabs deflect upon routing wiring through the first and second wiring ports.

6. The electrical junction box of claim 5, wherein the first and second tabs clamp down on wiring routed through the first and second wiring ports.

7. The electrical junction box of claim 1, wherein the first wiring port is substantially adjacent to the second wiring port.

8. The electrical junction box of claim 1, wherein:
   the housing is characterized by a top surface, and the first direction is substantially normal to the top surface; and
   the housing is characterized by a rear surface, and the second direction is substantially normal to the rear surface.

9. The electrical junction box of claim 1, wherein the first and second tabs deflect upon routing wiring through the first and second wiring ports.

10. The electrical junction box of claim 1, wherein the first and second tabs clamp down on wiring routed through the first and second wiring ports.

11. An electrical junction box comprising:
    a housing having a top surface and a rear surface;
    a plurality of wiring ports in the housing to accommodate electrical wiring routed into the housing; and
    a plurality of tabs resiliently connected to the housing, each tab substantially covering a wiring port of the plurality of wiring ports and characterized by an orientation to accommodate wiring entering the housing from a particular direction, the orientation between at least two tabs of the plurality of tabs differing from one another to accommodate wiring entering the housing from a direction substantially normal to the top surface and a direction substantially normal to the rear surface.

12. The electrical junction box of claim 11, wherein the plurality of wiring ports are substantially adjacent to one another.

13. The electrical junction box of claim 12, wherein the orientation of the plurality of tabs is varied to accommodate wiring entering the housing from a direction substantially normal to a top surface of the housing and a direction substantially normal to a rear surface of the housing.

14. The electrical junction box of claim 13, wherein the orientation of the plurality of tabs is varied by approximately one hundred eighty degrees.

15. The electrical junction box of claim 11, wherein the orientation of the plurality of tabs is varied by approximately one hundred eighty degrees.

16. The electrical junction box of claim 11, wherein each tab deflects upon routing wiring through a wiring port corresponding to each tab.

17. The electrical junction box of claim 11, wherein each tab clamps down on wiring routed through a wiring port corresponding to each tab.

* * * * *